United States Patent
Koseoglu et al.

(10) Patent No.: US 10,995,278 B2
(45) Date of Patent: May 4, 2021

(54) DISPOSAL OF DISULFIDE OIL COMPOUNDS AND DERIVATIVES IN DELAYED COKING PROCESS

(71) Applicant: Saudi Arabian Oil Company, Dhahran (SA)

(72) Inventors: Omer Refa Koseoglu, Dhahran (SA); Robert Peter Hodgkins, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 94 days.

(21) Appl. No.: 16/565,949

(22) Filed: Sep. 10, 2019

(65) Prior Publication Data

US 2021/0071092 A1  Mar. 11, 2021

(51) Int. Cl.
*C10G 9/00* (2006.01)
*C10G 29/10* (2006.01)
*B01J 31/02* (2006.01)

(52) U.S. Cl.
CPC ........... *C10G 9/005* (2013.01); *B01J 31/0211* (2013.01); *C10G 29/10* (2013.01); *C10G 2300/107* (2013.01); *C10G 2300/1077* (2013.01); *C10G 2300/202* (2013.01); *C10G 2300/708* (2013.01); *C10G 2300/80* (2013.01)

(58) Field of Classification Search
None
See application file for complete search history.

(56) References Cited

U.S. PATENT DOCUMENTS

| | | | |
|---|---|---|---|
| 4,399,024 A | 8/1983 | Fukui et al. | |
| 5,853,565 A | 12/1998 | Cayton | |
| 7,303,664 B2 | 12/2007 | Siskin et al. | |
| 7,604,730 B1 * | 10/2009 | Humblot | C10G 9/16 208/48 R |
| 8,791,314 B2 * | 7/2014 | Fremy | C10G 9/16 585/650 |

OTHER PUBLICATIONS

Anand Singh et al., "Role of Presulfidation and H2O Cofeeding on Carbon Formation on SS304 Alloy During the Ethane-Steam Cracking Process at 700° C" (Abstract only), Ind. Eng. Chem. Res, Jan. 16, 2018, 57(4), pp. 1146-1158, Copyright 2018 American Chemical Society.
Jidong Wang et al., "Influence of Dimethyl Disulfide on Coke Formation During Stream Cracking of Hydrocarbons" (Abstract only), Ind. Engl. Chem. Res., Jan. 18, 2007, 46(12), pp. 4134-4148, Copyright 2007 American Chemical Society.

* cited by examiner

*Primary Examiner* — Derek N Mueller
(74) *Attorney, Agent, or Firm* — Abelman, Frayne & Schwab

(57) ABSTRACT

A heavy hydrocarbon oil is mixed with one or more disulfide oil compounds and/or one or more oxidized disulfide oil compounds and, optionally, a homogeneous catalyst includes dissolved hydrogen, and the mixture is subjected to a delayed coking process to produce a liquid coking unit product stream for recovery and further processing, with the delayed coking being completed in a reduced residence time as compared to the delayed coking of the heavy hydrocarbon oil without the DSO and/or ODSO compounds.

11 Claims, 2 Drawing Sheets

DISPOSAL OF DISULFIDE OIL COMPOUNDS AND DERIVATIVES IN DELAYED COKING PROCESS

BACKGROUND OF THE INVENTION

Field of the Invention

This invention relates to a process for the disposal of disulfide oils and their derivatives.

Description of Related Art

It is known in the art that the presence of mercaptans in petroleum products are undesirable because of their unpleasant odor and corrosivity and also because they degrade the stability of end-product fuels. Processes in oil refineries and natural gas processing plants that remove mercaptans and/or hydrogen sulfide ($H_2S$) are commonly referred to as sweetening processes because they result in products which no longer have the sour, foul odors of mercaptans and hydrogen sulfide. The liquid hydrocarbon disulfides can remain in the sweetened end products; or they can be used as part of the petroleum refinery or natural gas processing plant fuel; or they can be subjected to further downstream processing.

The MEROX designation is derived from the mercaptan oxidation step of the process. The MEROX process is a proprietary catalytic mercaptan oxidation process widely used in petroleum refineries and natural gas processing plants to remove mercaptans contained in end-products such as LPG, propane, butanes, light naphtha, kerosene and jet fuel by converting them into liquid hydrocarbon disulfides, or disulfide oil (DSO) compounds. It is an integrated process comprising the mercaptan extraction step in which mercaptans react with an aqueous caustic solution in the presence of a catalyst to form an alkylthiolate, which is then oxidized in a wet air oxidation step to produce disulfide oils and a regenerated caustic solution that is recycled to the extraction step. The alkaline environment required in some versions of the practice of the MEROX process is provided by an aqueous solution of sodium hydroxide (NaOH), a strong base, and in other versions of the process, by ammonia, which is a relatively weaker base than sodium hydroxide, but also volatile and the ammonia must be handled with special care due to its irritant and toxicity properties. In other versions of the process, an aqueous solution of potassium hydroxide is used to provide the alkaline environment needed.

The stepwise reaction schemes for the MEROX process beginning with the treatment of the mercaptan are as follows:

$$2RSH + 2NaOH \rightarrow 2NaSR + 2H_2O \quad (1)$$

In the above reaction, RSH is a mercaptan and R is an organic group such as a methyl, ethyl, propyl or other hydrocarbon group. For example, the ethyl mercaptan (ethanethiol) has the formula $C_2H_5SH$.

The catalyst used in some versions of the MEROX process is a water-soluble liquid and in other versions the catalyst is impregnated onto charcoal granules. The catalyst used in the MEROX process can be an organometallic compound.

The second step is referred to as regeneration and it involves heating and oxidizing the caustic solution leaving the extractor. The oxidation results in converting the extracted mercaptans to organic disulfides (RSSR). These disulfide oils are water-insoluble liquids that are separated and decanted from the regenerated aqueous caustic solution. The regeneration reaction scheme is as follows:

$$4NaSR + O_2 + 2H_2O \rightarrow 2RSSR + 4NaOH \quad (2)$$

In reactions (1) and (2), R is methyl or a hydrocarbon chain that can be straight, branched or cyclic. The R chains can be saturated or unsaturated. In most petroleum and diesel fractions, mixtures of mercaptans will occur so that the R groups in the disulfide oil (RSSR) can be the same or different groups.

The liquid disulfide oils created by the conversion of the mercaptans do not have their undesirable characteristics and have been retained in the MEROX treated fuels or removed and used elsewhere in the petroleum refinery. The MEROX process is generally more economical than a catalytic hydrodesulfurization process and achieves much the same result for the mercaptans removal. Economic and practical drawbacks associated with hydrodesulfurization processes include additional dedicated facilities to which the disulfide compounds must be transferred, use of expensive and sensitive catalysts and the treatment and disposal of the by-product sulfur-containing compounds.

On a global basis, MEROX mercaptan oxidation units are commonly found in refineries and the disulfides generated are blended with fuel oil or processed in hydrotreating or hydrocracking process units or injected into the ground to dispose them. When the disulfides are added to fuel oil, they are typically burned to produce steam or provide other utilities. This use can raise environmental concerns where the combustion gases with sulfur-containing constituents are emitted in the refinery. The disulfides may undergo hydroprocessing, but hydroprocessing is not a favored method for the economic disposal of waste oil because of the additional hydrogen that is required and consumed.

By-product disulfide oil (DSO) compounds from the mercaptan oxidation process, commonly referred to as the "MEROX" process, can be oxidized, preferably in the presence of a catalyst to constitute an abundant source of the ODSO compounds that are sulfoxides, sulfonates, sulfones and sulfonates. The oxidant can be a liquid peroxide selected from the group consisting of alkyl hydroperoxides, aryl hydroperoxides, dialkyl peroxides, diaryl peroxides, peresters and hydrogen peroxide. The oxidant can also be a gas, including air, oxygen, ozone and oxides of nitrogen. The catalyst is preferably a homogeneous water soluble compound that is a transition metal containing an active species selected from the group consisting of Mo (VI), W (VI), V (V), Ti (IV), and their combination.

A coking unit is an oil refinery processing unit that can be used to convert relatively low value residual oil, or residua, from the vacuum distillation column or the atmospheric distillation column into low molecular weight hydrocarbon gases, naphtha, light and heavy gas oils, and petroleum coke. The process thermally cracks the long chain hydrocarbon molecules in the residual oil feed into shorter chain molecules. Coking is the preferred option for processing vacuum residues containing high level of metals because the metals end up in the coke by-product and are disposed of more easily and economically in this solid form. The liquid coking unit products are substantially free of metals.

The processing of heavy crude oils having high metals and sulfur content is increasing in many refineries, and as a result the delayed coking operations are of increasing importance to refiners. The increasing concern for minimizing air pollution is another incentive for treating vacuum residues in a coker, since the coker produces gases and liquids having sulfur in a form that can be relatively easily removed from the product stream.

The most commonly used coking unit is a delayed coking unit, or a "delayed coker". In a basic delayed coking process, fresh feedstock is introduced into the lower part of a fractionator. The fractionator bottoms including heavy recycle material and fresh feedstock are passed to a coking furnace and heated to a coking temperature. The hot feed then goes to a coking drum maintained at coking conditions where the feed is cracked to form lighter products and long chain free radicals combine to form heavy polynuclear aromatic (HPNA) compounds, which are deposited on the wall of the coking drum and referred to as "coke." With a short residence time in the furnace, the formation of coke, or the coking of the feed is thereby "delayed" until it is deposited onto the wall(s) of the coking drum. The volatile components are passed out of the drum as the coking unit product stream. Light gases are separated from the condensed liquid coker product stream, which is eventually passed to the coker liquid product fractionator. When the coking unit drum is full of coke, the feed is switched to another drum and the full drum is cooled and emptied by conventional methods, e.g., by hydraulic or mechanical means.

As noted above, typical coking unit feedstocks are vacuum residues derived from fossil fuels. Vacuum residue samples derived from crude oils from various geographical regions typically have low American Petroleum Institute (API) gravities in the range of from 1 to 20 degrees and a sulfur content that ranges from 0.2 to 7.7 W %. In addition, vacuum residues are rich in nitrogen and can contain metals such as nickel and vanadium in relatively high concentrations which make them difficult to process in other refinery unit operations.

Vacuum residues also contain asphaltenes in the range 0.3 to 35 W %, depending upon the source of the crude oil. Asphaltenes are defined as the particles precipitated by addition of a low-boiling paraffin solvent such as normal-pentane. It is commonly accepted that asphaltenes exist in solution in the petroleum. Asphaltenes are commonly modeled as a colloid, with asphaltenes as the dispersed phase and maltenes as the continuous phase. Petroleum residua can be modeled as ordered systems of polar asphaltenes dispersed in a lower polarity solvent phase, and held together by resins of intermediate polarity.

With the asphaltenes dispersed by resin molecules, or maltenes, small molecules such as aromatics act as a solvent for the asphaltenes-resin dispersion and saturated hydrocarbons act as a non-solvent. If a crude oil is separated into fractions and then mixed together with a lower resin content than originally present, asphaltenes will be present as flocculates in solution. Addition of the resins or maltenes brings the asphaltenes back into solution until the equilibrium is disturbed by addition of saturated hydrocarbons, of which point asphaltenes will again start to flocculate.

It is well known and accepted that coke formation is delayed when the asphaltenes are in solution in the petroleum. This delay in coke formation is also referred as the "induction period" which immediately precedes the formation of coke. During this period, valuable lighter components and/or secondary products formed by coking of feedstocks are subject to continued thermal cracking and recombine to form undesirable high molecular weight polymeric compounds.

It is also known from independent studies of the thermal cracking of bitumens that the yield of lower molecular weight gaseous products increases with the residence time in the coking unit and that liquid yields are correspondingly reduced.

In practice, it is desirable that when the coke is removed from the drum that it has a volatile matter content of not more than about 15 W %, and that it is preferably in the range of 6 to 12 W %.

It is therefore an object of this invention to address the problem of how to reduce the coking induction period so that the residence time of the heavy hydrocarbon feed in the coking unit/drum is shortened, to thereby optimize the yield of desirable liquid coking unit products.

Another problem addressed by the present invention is the need for a cost effective and environmentally acceptable alternative to those discussed above for the disposal of disulfide oil compounds and their derivatives.

SUMMARY OF THE INVENTION

The above problems are addressed and other advantages are provided by the process of the present disclosure that economically converts disulfide oils and their derivatives, oxidized disulfide oils, which are of relatively low value to the refinery operator, into coke and liquid coking unit products of comparatively greater value that can be used in downstream processes in the same refinery.

It is known that at low concentrations, e.g., in the range of 100 ppmw or less, the addition of the DSO, particularly, dimethyl disulfide (DMDS) to a visbreaker feedstream will minimize coke formation in the coking unit furnace. In accordance with the present disclosure, it has been found that at significantly higher concentrations, i.e., in the range of from about 1,000 ppmw or 5,000 ppmw and up to 50,000 ppmw, the addition of DSO and/or ODSO compounds to a delayed coker feedstream enhances coke formation and reduces and optimizes the coking residence time of the hot feed in the delayed coking unit drum(s).

In this process, disulfide oils (DSO) and/or their derivative oxidized disulfide oils (ODSO) are advantageously disposed of by:

a. introducing a heavy hydrocarbon oil feedstream and the disulfide oils and/or oxidized disulfide oils into a mixing zone upstream of the coking unit furnace to provide what will be referred to for convenience as a "blended heavy oil mixture";

b. heating the blended heavy oil mixture in the coking unit furnace to the delayed coking temperature;

c. passing the heated blended heavy oil mixture to at least one coking drum of a delayed coking unit operated under coking conditions to deposit coke on the interior of the at least one coking drum; and d. recovering a delayed coking unit liquid product stream.

In an embodiment, the delayed coking process is improved by adding to the feed a homogeneous catalyst. It is understood that the presence of a catalyst can enhance the hydrogen transfer reactions and thereby improve the quantity and quality of light products produced. Suitable catalyst compositions include transition metal-based compounds derived from an organic acid salt, or an organo-metal compound containing molybdenum, vanadium, tungsten, chromium or iron. Useful catalyst compositions include vanadium pentoxide, molybdenum alicyclic and aliphatic carboxylic acids, molybdenum naphthenate, nickel 2-ethylhexanoate, iron pentacarbonyl, molybdenum 2-ethylhexanoate, molybdenum di-thiocarboxylate, nickel naphthenate and iron naphthenate. The homogeneous catalyst can be added to the DSO and/or ODSO that is to be used in the process prior to, or simultaneously with the addition of the heavy hydrocarbon oil to the mixing zone.

The present invention also economically and beneficially disposes of disulfide oils and/or oxidized disulfide oils in an environmentally acceptable manner. It is understood that sulfur is distributed among the products formed, i.e., deposited with the coke, converted to $H_2S$, and bound to new sulfur-containing compounds.

A further advantage of the process of this disclosure is that the addition of DSO and ODSO accelerates the formation of coke so that residence time is reduced in the delayed coking process.

The practice of the present process results in an increase in the production of coke as compared to the amount of coke produced from the heavy oil alone. The process reduces the residence time of the feed in the delayed coking drum.

Another benefit is that these advantages can be achieved with relatively minor modifications to existing delayed coking units and with correspondingly low capital expenditures. The two principal additions are a storage tank for the ODS/ODSO and a mixing vessel or in-line mixing apparatus, and their associated pumps, gauges, metering valves and the like.

Since the DSO is formed directly as a by-product of the mercaptan oxidation process, it will be most expedient and economically advantageous to send the DSO to the delayed coking unit for processing, or to a storage vessel for accumulation to insure a sufficient and consistent supply to the coking unit. The ODSO may be available for co-processing with DSO, or as a separate feed where excess ODSO was prepared for use in one or more other refinery processes.

It is noted that DSO compounds and ODSO compounds are generally immiscible, with the exception that DSO compounds can be dissolved in the ODSO compounds in low concentrations under standard temperature and pressure conditions. For the purpose of the delayed coking process of the present disclosure, the compounds can be injected one into the other, or into the heavy hydrocarbon feedstream employing apparatus and methods known in the art to achieve the desired degree of mixing. The mixture is then heated in the furnace and passed to the coking drum.

In the description that follows, the terms "disulfide oil", "disulfide oils", "DSO", "DSO mixture" and "DSO compound(s)" may be used interchangeably for convenience.

In the description that follows, the terms "oxidized disulfide oil", "oxidized disulfide oils", "derivative of disulfide oil", "ODSO", "ODSO mixture" and "ODSO compound(s)" may be used interchangeably for convenience.

In the description that follows, the terms "DSO/ODSO", "DSO/ODSO mixture" and "DSO/ODSO compound(s)" may be used interchangeably for convenience.

In the description that follows, the terms "delayed coking unit", "coking unit", "delayed coker" and "coker" refer to the same apparatus and may be used interchangeably.

BRIEF DESCRIPTION OF THE DRAWINGS

The invention will be described in greater detail below and with reference to the attached drawings in which.

DETAILED DESCRIPTION OF THE INVENTION

Figure 1:
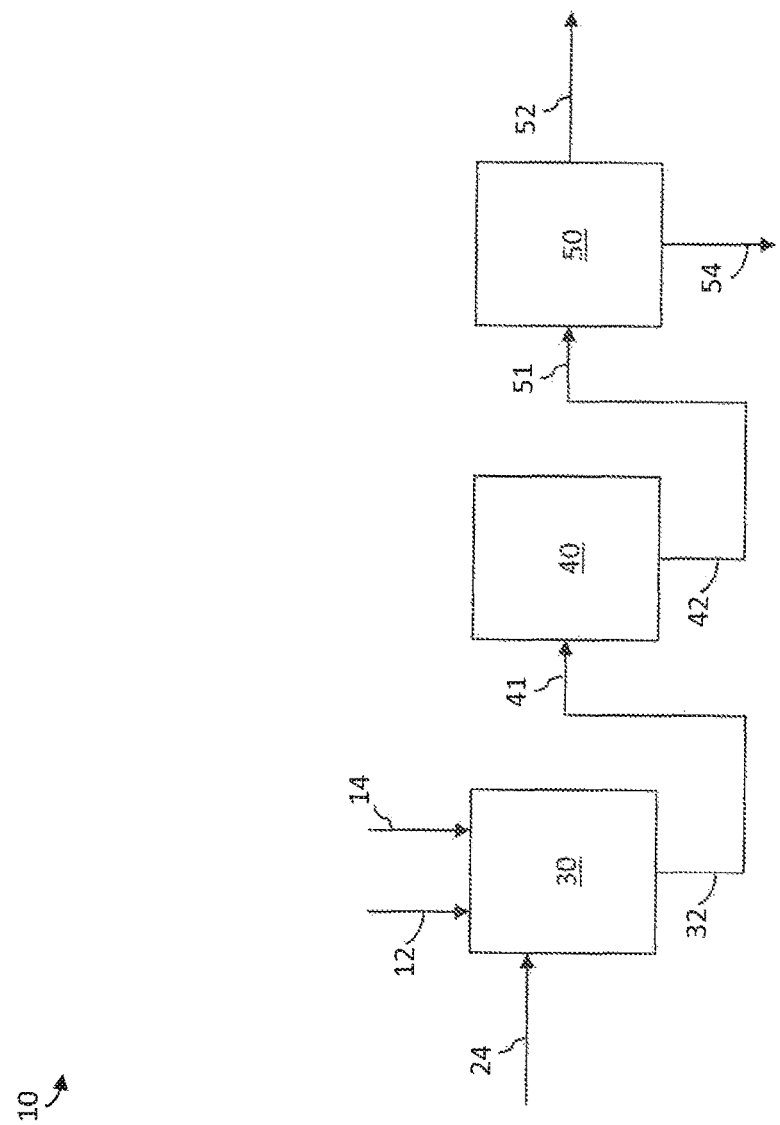
FIG. 1 is a simplified schematic illustration of a system for the practice of a delayed coking process according to the present disclosure.

The process of the present disclosure for treating by-product disulfide oil compounds and, optionally, their derivative oxidized disulfide oil compounds in a delayed coking unit will be described with reference to FIG. 1. The process and system (10) include a mixing zone 30, a coking furnace (40) and coking unit (50).

The heavy hydrocarbon oil (12) is introduced into the mixing zone (30) which includes an inlet (24) for introducing a liquid homogeneous catalyst, and an inlet (14) for the DSO, ODSO and/or a mixture of DSO/ODSO. As shown, mixing zone (30) also includes an outlet (32) for discharging the blended heavy oil mixture. Mixing zone (30) also comprehends an alternative system in which the heavy hydrocarbon oil and the other additive components comprising the feed to the delayed coking unit are stored in two or more tanks (not shown) that are in fluid communication with pumps equipped with controllers that adjust the rate of discharge in response to control signals from a programmed microprocessor. In this alternative system, the feed components are simultaneously injected into a conduit upstream of the coking furnace.

Coking furnace (40) includes an inlet (41) in fluid communication with mixing zone outlet (32) and an outlet (42) for discharging the heated blended heavy oil mixture.

Coking unit (50) includes an inlet (51) in fluid communication with furnace outlet (42) and an outlet (52) for the delayed coking product stream and an outlet (54) for recovering the coke when it has eventually been freed from the inside of the cooled drum.

In the practice of the process of the invention, a fresh heavy hydrocarbon feedstock is introduced into mixing zone (30) for mixing or blending with the DSO, ODSO, or a mixture of DSO/ODSO to produce the blended heavy oil mixture. A homogeneous catalyst is optionally added to the mixing zone, or to the DSO and/or ODSO upstream of the mixing zone (30).

The blended heavy oil mixture is introduced into furnace (40) via inlet (41) where it is heated to a predetermined coking temperature that is in the range of from 480° C. to 530° C. The heated blended heavy oil mixture is discharged via the outlet (42) and passed to coking unit (50) via inlet (51) for introduction into at least one coking drum where it is thermally cracked to produce the delayed coking unit product stream of gases and liquids, with the coke being deposited on the interior of the drum of the coking unit. The delayed coking product stream is discharged via outlet (52) for downstream processing, e.g., separation of the gases and fractionation of the liquid portion in a coking unit fractionator (not shown). Coking unit (50) also produces a coke product that is subsequently removed by conventional means from the cooled coking drum via outlet (54).

Figure 2:
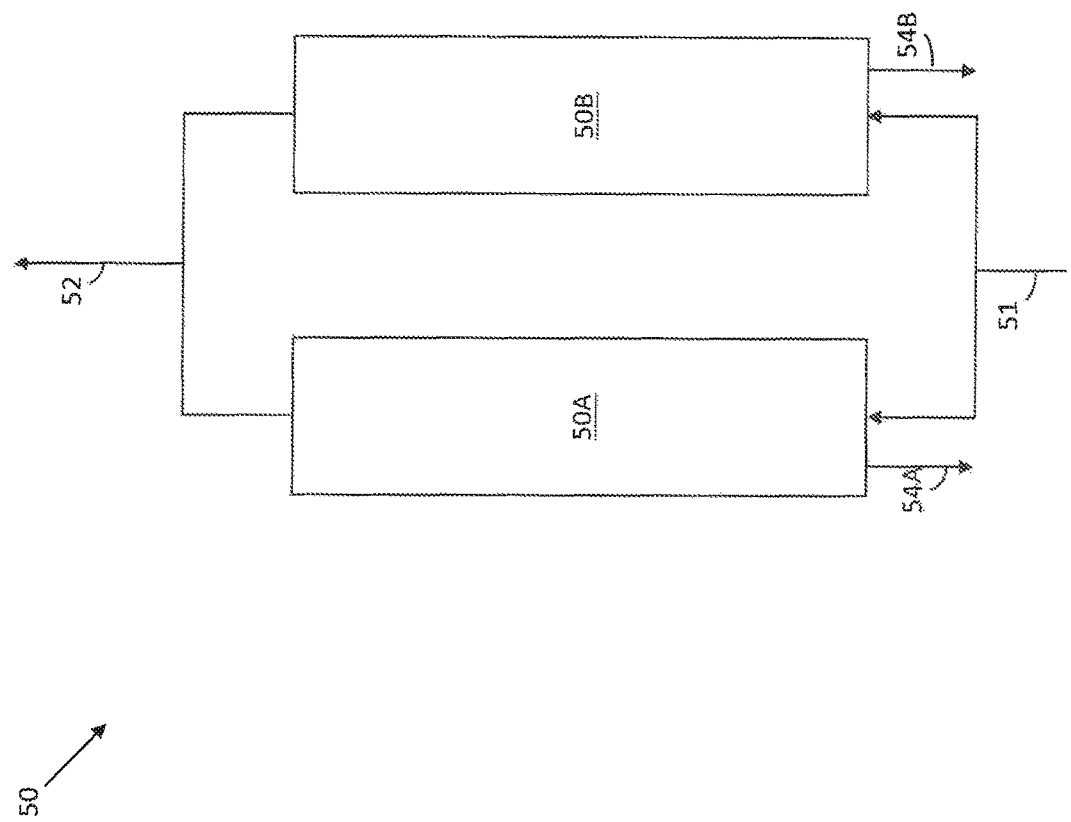
FIG. 2 is a simplified schematic illustration of a typical delayed coking unit for use in the system of FIG. 1.

Referring now to FIG. 2, the delayed coking unit (50) includes at least two drums (50A, 50B). The coking unit produces a delayed coking unit liquid product stream that is discharged via outlet (52) and a solid coke product that is eventually recovered via outlets (54A and 54B), respectively. The drums (50A and 50B) are operated in swing mode. When the operating drum is filled to capacity with coke, the heated blended heavy oil mixture discharged from the furnace (40) via outlet (42) is switched to the parallel drum for continuous operation of the unit. The coke product is then cooled and removed from the first drum by conventional means.

In some embodiments, the operating temperature of the coking drum can be in the range of from 425° C. to 650° C., 425° C. to 540° C., 425° C. to 510° C., 425° C. to 500° C., 450° C. to 510° C., 450° C. to 650° C., 450° C. to 540° C., 450° C. to 500° C., 470° C. to 650° C., 470° C. to 540° C., 470° C. to 510° C. or 470° C. to 500° C. The operating pressure of the coking drum is mildly super-atmospheric and can be in the range of from 1 to 60 bar, from 3 to 20 bar, from 2 to 10 bar, or from 3 to 7 bar. The coking cycle time can range from 1 hrs to 60 hrs; from 10 hrs to 48 hrs; from 24 hrs to 60 hrs, from 8 hrs to 48 hrs, or from 8 hrs to 24 hrs. These ranges are dependent in part on the capacity of the drums and the nature of the heavy hydrocarbon oil feed.

In some embodiments, the heavy oil portion of the feedstream is a vacuum residue (VR) fraction boiling at or above 480° C., an atmospheric residue (AR) fraction boiling at or above 350° C., or a whole crude oil boiling at or above 36° C.

In some embodiments, the DSO, ODSO, or the mixture of DSO/ODSO is present in a concentration in the range of from 1 wt % to 75 wt %, or from 5 wt % to 70 wt %, or from 1 wt % to 10 wt %.

Example 1

A vacuum residue (VR) oil sample "VR-1" derived from an Arab medium crude oil was blended with DSO compounds and subjected to delayed coking. The vacuum residue and DSO were blended at the various weight percentages indicated in Columns 1 and 2 of Table 1.

TABLE 1

| 1 Vacuum Residue W % | 2 DSO W % | 3 MCR of Blend Measured W % | 4 MCR Expected calculation W % | 5 MCR VR Basis W % | 6 Coke Yield W % |
|---|---|---|---|---|---|
| 100 | 0 | 23.4 | 23.4 | 23.4 | 37.4 |
| 95 | 5 | 22.3 | 22.2 | 23.5 | 37.6 |
| 91 | 9 | 21.8 | 21.3 | 24.0 | 38.3 |
| 67 | 33 | 16.4 | 15.7 | 24.5 | 39.2 |
| 50 | 50 | 12.6 | 11.7 | 25.2 | 40.3 |

Each blend was analyzed for its micro carbon residue (MCR) content using the procedure of ASTM D4530, with the results shown in Column 3 of Table 1. Assuming that only the vacuum residue contributes to the overall MCR content, the expected MCR content for each blend is listed in Column 4 of Table 1. It is understood that the sulfur introduced with the DSO is distributed among the solid, liquid and gaseous products formed during the coking step. In accordance with standing refinery practices, the coking unit products will be subjected to hydrotreating and other downstream processing.

The computer program used to calculate the expected values entered in Column 4 was described by J. F. Schabron and J. G. Speight in an article entitled "An Evaluation of the Delayed-Coking Product Yield of Heavy Feedstocks Using Asphaltene Content and Carbon Residue", *Oil & Gas Science and Technology—Rev. IFP*, Vol. 52 (1997), No. 1, pp. 73-85.

The normalized MCR content is entered in Column 5 of Table 1. The MCR content of each of the blends is normalized to the vacuum residue concentration, according to the equation:

$$\frac{\text{Measured } MCR \text{ of blend (W \%)}}{\text{Measured vacuum residue in blend (W \%)}} \times 100 \quad (3)$$

In order to calculate the expected coke yield of Column 6 in Table 1, the normalized MCR content from Column 5 of Table 1 was multiplied by a factor of 1.6 based on a model commonly utilized in the industry that has been found to be accurate.

It is clear from the results reported in Example 1 that in the delayed coking of a blend of vacuum residue and DSO that the expected coke yield increases with an increase in the DSO content. This indicates that the presence of DSO gradually increases coke formation in the delayed coking unit with the addition of up to 50 wt %, where the increase in coke production was over 7%.

Example 2

Another vacuum residue (VR) oil sample derived from an Arab medium crude oil was mixed with ODSO compounds to form a blended heavy oil mixture and subjected to delayed coking. The weight percent of vacuum residue to ODSO was varied over the range from 100% VR to 24.5 W %, with the corresponding maximum of 75.5 W % ODSO, as entered in Columns 1 and 2 of Table 2.

TABLE 2

| 1 Vacuum Residue W % | 2 ODSO W % | 3 MCR of Blend Measured W % | 4 MCR Expected Calculated W % | 5 MCR VR Basis W % | 6 Coke Yield W % |
|---|---|---|---|---|---|
| 100.0 | 0.0 | 21.7 | 21.7 | 21.7 | 34.7 |
| 90.6 | 9.4 | 20.7 | 19.7 | 22.8 | 36.6 |
| 75.5 | 24.5 | 21.3 | 16.4 | 28.2 | 45.1 |
| 50.0 | 50.0 | 15.5 | 10.9 | 31.0 | 49.6 |
| 27.5 | 72.5 | 9.9 | 6.0 | 36.1 | 57.6 |
| 24.5 | 75.5 | 11.9 | 5.3 | 48.6 | 77.7 |

Each blended heavy oil mixture was analyzed for its MCR content using the ASTM D4530 method, with the results shown in Column 3 of Table 2. Assuming that only the vacuum residue contributes to the overall MCR content, the expected MCR content for each blend is listed in Column 4 of Table 2. The normalized MCR content is entered in Column 5 of Table 2. The MCR content of each of the blends is normalized to the vacuum reside concentration, according to equation (3) above.

In order to calculate the expected coke yield for Column 6 of Table 2, the normalized MCR content from Column 5 of Table 2 was multiplied by a factor of 1.6 as described above.

It is clear from the results of Example 2 that in the delayed coking of mixtures of vacuum residue and ODSO, the coke yield increases as the ODSO content is increased. This data indicates that the presence of ODSO at 50 weight % results in an increase in coke formation of about 43% and at 75% of ODSO in a 124% increase in coke formation.

The results of both Example 1 and Example 2 indicate that the presence of either DSO compounds or ODSO compounds in a heavy hydrocarbon feed to a delayed coking unit will result in a substantial savings in processing time.

The process and system of the present invention have been described above and in the attached figures; process modifications and variations will be apparent to those of ordinary skill in the art from this description and the scope of protection is to be determined by the claims that follow.

We claim:

1. A process for the delayed coking of a heavy hydrocarbon oil feed, the process comprising:
   a. introducing and mixing the heavy oil hydrocarbon teed and one or more disulfide oil compounds, or oxidized disulfide oil compounds, or disulfide oil and oxidized disulfide oil compounds in a mixing zone and recovering a blended heavy oil mixture;

b. heating the blended heavy oil mixture in a coking unit furnace to a delayed coking temperature;

c. passing the heated blended heavy oil mixture to at least one coking drum of a delayed coking unit to produce a delayed coking unit product stream and depositing coke on the interior of the drum; and d. recovering the delayed coking unit liquid and vapor product stream for further downstream processing, wherein the coke formation in the coking drum is enhanced by promoting the formation of coke more rapidly than would occur in the coking of the heavy hydrocarbon oil feed in the absence of the DSO or ODSO.

2. The process of claim 1 which includes adding a homogeneous liquid catalyst for inclusion in the blended heavy oil mixture introduced into the delayed coking unit.

3. The process of claim 2 in which the homogeneous liquid catalyst includes transition metal-based compounds derived from an organic acid salt, or from an organo-metal compound containing molybdenum, vanadium, tungsten, chromium or iron.

4. The process of claim 2, in which the catalyst is selected from the group consisting of vanadium pentoxide, molybdenum alicyclic and aliphatic carboxylic acids, molybdenum naphthenate, nickel 2-ethylhexanoate, iron pentacarbonyl, molybdenum 2-ethylhexanoate, molybdenum di-thiocarboxylate, nickel naphthenate and iron naphthenate.

5. The process of claim 1 in which the disulfide oil comprises a plurality of disulfide oil compounds.

6. The process of claim 1 in which the oxidized disulfide oil comprises a plurality of oxidized disulfide oil compounds.

7. The process of claim 1 in which the disulfide oil or oxidized disulfide oil constitutes from 0.001-5 W %, 0.1-50 W %, 0.5-30 W %, 0.5-10 W % or 5-75 W % of the total weight of the blended heavy oil mixture.

8. The process of claim 1 in which the blended heavy oil mixture is heated to a temperature in the range of from 480° C. to 530° C. in the coking furnace.

9. The process of claim 1 in which the heavy hydrocarbon oil feedstream is a vacuum residue fraction boiling at or above 480° C. an atmospheric residue fraction boiling at or above 350° C., or a whole crude oil boiling at or above 36° C.

10. The process of claim 1 in which the delayed coking unit comprises at least two drums that operate in swing mode.

11. A method of enhancing the formation of coke in the drum of a delayed coking unit during the delayed coking of a heavy hydrocarbon oil feed, the method comprising:

a. introducing and mixing the heavy hydrocarbon oil feed and one or more disulfide oil compounds, or oxidized disulfide oil compounds, or disulfide oil and oxidized disulfide oil compounds in a mixing zone and recovering a blended heavy oil mixture;

b. heating the blended heavy oil mixture in a coking unit furnace to a delayed coking temperature; and c. passing the heated blended heavy oil mixture to at least one coking drum of a delayed coking unit to produce a delayed coking unit product stream and depositing coke on the interior of the drum, wherein the coke is formed more rapidly than would occur in the coking of the heavy hydrocarbon oil feed in the absence of the DSO and/or ODSO compounds.

* * * * *